(12) United States Patent
Du et al.

(10) Patent No.: US 12,087,971 B2
(45) Date of Patent: Sep. 10, 2024

(54) POWER SUPPLY ASSEMBLY AND METHOD FOR MANUFACTURING THE SAME

(71) Applicant: BEIJING XIAOMI MOBILE SOFTWARE CO., LTD., Beijing (CN)

(72) Inventors: Longfei Du, Beijing (CN); Hongbin Zheng, Beijing (CN); Xuewen Wei, Beijing (CN); Zongqiang Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 58 days.

(21) Appl. No.: 17/334,957

(22) Filed: May 31, 2021

(65) Prior Publication Data
US 2022/0166116 A1    May 26, 2022

(30) Foreign Application Priority Data
Nov. 20, 2020   (CN) .......................... 202011306423.8

(51) Int. Cl.
*H01M 50/533*    (2021.01)
*H01M 10/0525*   (2010.01)
(Continued)

(52) U.S. Cl.
CPC ..... *H01M 50/533* (2021.01); *H01M 10/0525* (2013.01); *H01M 10/0587* (2013.01); *H01M 50/536* (2021.01); *H01M 50/538* (2021.01)

(58) Field of Classification Search
CPC ............. H01M 50/533; H01M 50/538; H01M 50/536; H01M 10/0525; H01M 10/0587
(Continued)

(56) References Cited

U.S. PATENT DOCUMENTS

| | | | |
|---|---|---|---|
| 2011/0151295 A1 | 6/2011 | Kim | |
| 2014/0058598 A1* | 2/2014 | Matsui | H01M 4/505 |
| | | | 429/223 |

(Continued)

FOREIGN PATENT DOCUMENTS

| | | |
|---|---|---|
| CN | 104681877 A | 6/2015 |
| CN | 105990612 A | 10/2016 |

(Continued)

OTHER PUBLICATIONS

European Search Report in the European application No. 21176847.8, mailed on Nov. 22, 2021, (9 pages).

*Primary Examiner* — Jonathan G Jelsma
*Assistant Examiner* — Omar M Kekia
(74) *Attorney, Agent, or Firm* — Arch & Lake LLP (57) ABSTRACT

The present disclosure relates to a power supply assembly and a method for manufacturing the same. The power supply assembly includes a negative electrode sheet, a separator, and a positive electrode sheet. The negative electrode sheet includes a negative tab, and the positive electrode sheet includes a positive tab, a positive electrode material covering a first foil, a first recess and a second recess. The first recess is formed by removing a positive electrode material covering a first region of the first foil and configured for receiving the positive tab, and a size of the first recess is larger than a size of the positive tab. The second recess is formed by removing a positive electrode material covering a second region of the first foil and configured for receiving the negative tab, and a size of the second recess is larger than a size of the negative tab.

10 Claims, 6 Drawing Sheets

(51) Int. Cl.
*H01M 10/0587* (2010.01)
*H01M 50/536* (2021.01)
*H01M 50/538* (2021.01)

(58) Field of Classification Search
USPC .......................................................... 429/211
See application file for complete search history.

(56) References Cited

U.S. PATENT DOCUMENTS

| | | | |
|---|---|---|---|
| 2016/0013455 A1 | 1/2016 | Shiu et al. | |
| 2016/0365544 A1 | 12/2016 | Lee | |
| 2017/0214028 A1 | 7/2017 | Oh et al. | |
| 2018/0026254 A1 | 1/2018 | Oh et al. | |
| 2020/0083497 A1* | 3/2020 | Sabrowsky | H01M 50/109 |
| 2020/0313196 A1 | 10/2020 | Shao et al. | |
| 2020/0403211 A1* | 12/2020 | Kim | H01M 10/0587 |
| 2021/0210823 A1* | 7/2021 | Yuan | H01M 50/534 |

FOREIGN PATENT DOCUMENTS

| | | |
|---|---|---|
| CN | 107431232 A | 12/2017 |
| CN | 208596717 U | 3/2019 |
| CN | 110148777 A | 8/2019 |
| CN | 111370639 A | 7/2020 |
| CN | 211507765 U | 9/2020 |
| JP | 2000323136 A | 11/2000 |
| WO | 2020103014 A1 | 5/2020 |

\* cited by examiner

POWER SUPPLY ASSEMBLY AND METHOD FOR MANUFACTURING THE SAME

CROSS-REFERENCE TO RELATED APPLICATION

This application is based upon and claims priority to Chinese Patent Application No. 202011306423.8, filed Nov. 20, 2020, the entire content of which is incorporated herein by reference for all purposes.

TECHNICAL FIELD

The present disclosure relates to the technical field of power supply, and particularly to a power supply assembly and a method for manufacturing the same.

BACKGROUND

As a commonly-used energy storage assembly, lithium ion batteries and the like are widely used in electronic devices. As the user's demand for electronic devices with longer life gradually increases, the configured battery capacity needs to be increased. Generally, it takes a long time to charge a large capacity battery, which is not beneficial to improving user experience.

In the related art, the cell structure of the battery is improved by providing multiple tabs, so as to improve the rapid charging performance of the battery. However, when a battery cell is provided with multiple tabs, welding and bending of the multiple tabs would occupy a larger space, thereby making the battery cell thicker and limiting the application of the multi-tab structure into an ultra-thin battery cell. Moreover, the thickness of the electronic device equipped with the battery cell is increased, thereby reducing the portability of the electronic device.

SUMMARY

The present disclosure provides a power supply assembly and a method for manufacturing the same.

According to a first aspect of the present disclosure, a power supply assembly is provided, including a negative electrode sheet, a separator, and a positive electrode sheet. Herein, an end of the negative electrode sheet includes a negative tab, and an end of the positive electrode sheet includes a positive tab. The positive electrode sheet further includes a first foil and a positive electrode material, the positive electrode material covering a surface of the first foil. The negative electrode sheet further includes a second foil and a negative electrode material, the negative electrode material covering a surface of the second foil. The power supply assembly includes at least one of the following configurations: (a) the positive electrode sheet further includes a first recess and a second recess, the first recess is disposed at a first region of the positive electrode sheet by removing the positive electrode material covering a first region of the first foil, and is configured for receiving the positive tab bent toward the positive electrode sheet, in which a size of the first recess is larger than a size of the positive tab; the second recess is disposed at a second region of the positive electrode sheet by removing a positive electrode material covering a second region of the first foil, and is configured for receiving the negative tab, in which a size of the second recess is larger than a size of the negative tab; or, (b) the negative electrode sheet further includes a third recess and a fourth recess, the third recess is disposed at a third region of the negative electrode sheet by removing a negative electrode material covering a third region of the second foil, and is configured for receiving the positive tab bent toward the positive electrode sheet, in which a size of the third recess is larger than a size of the positive tab; and the fourth recess is disposed at a fourth region of the negative electrode sheet by removing a negative electrode material covering a fourth region of the second foil, and is configured for receiving the negative tab, in which a size of the fourth recess is larger than a size of the negative tab.

According to a second aspect of the present disclosure, a method for manufacturing a power supply assembly is provided, including the following steps: covering a surface of a first foil with a positive electrode material to form a positive electrode sheet, and covering a surface of a second foil with a negative electrode material to form a negative electrode sheet; wherein an end portion of the positive electrode sheet comprises a positive tab, and an end portion of the negative electrode sheet comprises a negative tab; winding the negative electrode sheet, a separator, and the positive electrode sheet; the method further comprises, before the step of winding the negative electrode sheet, the separator, and the positive electrode sheet, at least one of the following steps: (a) removing a positive electrode material on the positive electrode sheet covering a first region of the first foil to form a first recess, wherein the first recess is configured to receive the positive tab bent toward the positive electrode sheet, and a size of the first recess is larger than a size of the positive tab; and removing a positive electrode material on the positive electrode sheet covering a second region of the first foil to form a second recess, wherein the second recess is configured to receive the negative tab, and a size of the second recess is larger than a size of the negative tab; or (b) removing a negative electrode material on the negative electrode sheet covering a third region of the second foil to form a third recess, wherein the third recess is configured to receive the positive tab bent toward the positive electrode sheet, and a size of the third recess is larger than a size of the positive tab; and removing a negative electrode material on the negative electrode sheet covering a fourth region of the second foil to form a fourth recess, wherein the fourth recess is configured to receive the negative tab, and a size of the fourth recess is larger than a size of the negative tab.

It will be understood that the above general description and the following detailed description are merely exemplary and explanatory, and are not intended to limit the present disclosure.

BRIEF DESCRIPTION OF THE DRAWINGS

The accompanying drawings here, which are incorporated into the description and constitute a part of the description, illustrate examples consistent with the present disclosure and together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Figure 1A:
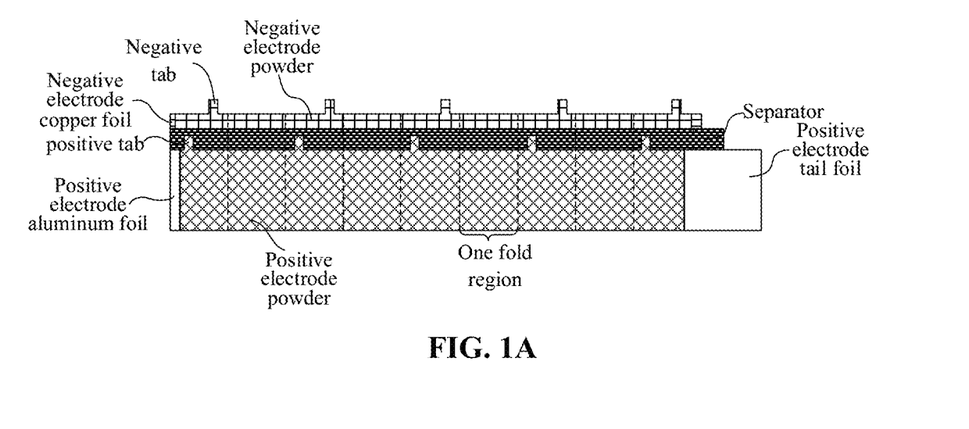
FIG. 1A is a partial schematic diagram of a battery according to one or more examples of the present disclosure.
Figure 1B:
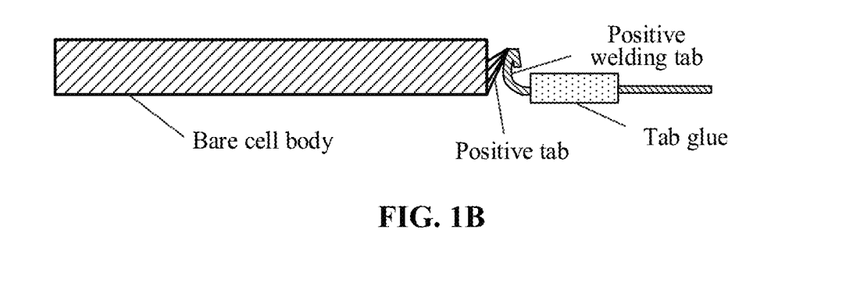
FIG. 1B is a partial schematic diagram of a battery according to one or more examples of the present disclosure.

FIG. 1A and FIG. 1B show a schematic diagram of a battery with a multi-tab structure. As shown in FIG. 1A and FIG. 1B, the battery includes a bare cell body, a welding tab, and tab glue. The bare cell body includes a winding pin (not shown), a negative electrode copper foil, a separator, and a positive electrode aluminum foil. FIG. 1A shows a partial schematic diagram of a battery when the negative electrode copper foil, the separator and the positive electrode aluminum foil are in a deployed state. FIG. 1B shows a schematic diagram of a battery when the negative electrode copper foil, the separator and the positive electrode aluminum foil are wound around the outer side of the winding pin.

As shown in FIG. 1A, the positive electrode aluminum foil is coated with positive electrode powder, and an end portion of the positive electrode aluminum foil is provided with multiple positive tabs. The negative electrode copper foil is coated with negative electrode powder, and an end portion of the negative electrode copper foil is provided with multiple negative tabs.

It is noted that two adjacent dotted lines in FIG. 1A are used to mark one fold region. When the negative electrode copper foil, the separator and the positive electrode aluminum foil are wound around the outer side of the winding pin, one fold region corresponds to one surface covering the winding pin, and two adjacent fold regions are stacked on one another.

Taking the positive electrode aluminum foil as an example, the current needs to be transmitted between the external device and the entire surface of the positive electrode aluminum foil through the positive tab. When only one positive tab is provided on the positive electrode aluminum foil, the current transmission path between the positive tab and the positive electrode aluminum foil is longer, and impedance of the cell is larger, so that the charging/discharging speed of the cell is reduced, and the amount of heat generated by the cell in the charging/discharging process is increased.

As shown in FIG. 1A, if multiple positive tabs are provided on the positive electrode aluminum foil, compared with the case in which only one positive tab is provided on the positive electrode aluminum foil, the current can be rapidly distributed to a corresponding fold region in which each positive tab is provided or an bend adjacent to the corresponding bend, so that the current transmission path is shortened and the impedance of the cell is reduced, thereby effectively increasing the charging speed of the cell, and reducing the amount of heat generated by the cell in the charging and discharging process.

If multiple positive tabs are provided on the positive electrode aluminum foil and welded to the positive welding tab, as shown in FIG. 1B, it is necessary to bend the positive tabs and the positive welding tab welded together twice, so that the positive tabs and the positive welding tab welded together form a first bending region of an "L" shape and a second bending region of an inverted "V" shape for packaging.

Moreover, since the positive tabs and the positive welding tab, which are welded together without being bent, are relatively sharp, collision or shaking occurs during use of the battery, which causes the positive tabs and the positive welding tab welded together to be inserted into the bare cell body, resulting in damage to the battery. Therefore, the first bending region formed by twice bending mentioned above can play a buffering role to avoid damage to the battery.

However, after the positive tabs and the positive welding tab welded together are bent, the thickness of the battery would be increased, and thus the application of the multi-tab structure in the ultra-thin battery cell is greatly limited. In addition, after the tabs are bent twice at the end of the cell, the bending region would increase the occupied space of the battery head. In the case that the size of the bare cell remains unchanged, the volume of the battery after being packaged is increased, and the energy density of the battery is reduced.

Figure 2:
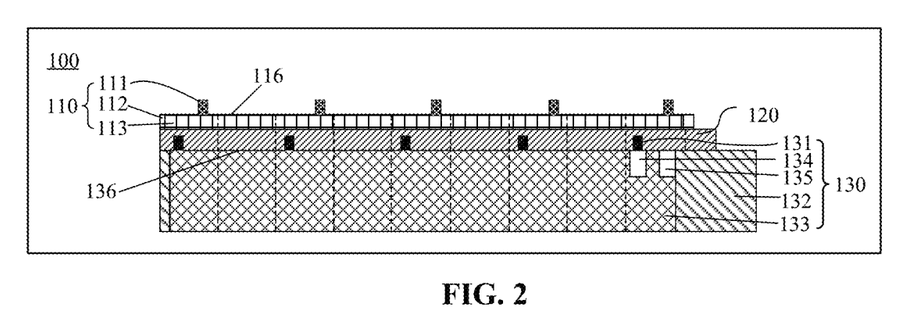
FIG. 2 is a schematic diagram of a power supply assembly according to an example of the present disclosure.

FIG. 2 is a schematic diagram of a power supply assembly 100 according to an example of the present disclosure. As shown in FIG. 2, a power supply assembly 100 includes a negative electrode sheet 110, a separator 120, and a positive electrode sheet 130. Herein, a first end portion 116 of the negative electrode sheet 110 includes negative tab(s) 111, and a second end portion 136 of the positive electrode sheet includes positive tab(s) 131.

The positive electrode sheet further includes a first foil 132, a positive electrode material 133, a first recess 134, and a second recess 135.

The positive electrode material covers a surface of the first foil.

The first recess is formed by removing a positive electrode material covering a first region of the first foil and configured for receiving the positive tab bent toward the positive electrode sheet. Herein, a size of the first recess is larger than a size of the positive tab.

The second recess is formed by removing a positive electrode material covering a second region of the first foil and configured for receiving the negative tab. Herein, a size of the second recess is larger than a size of the negative tab.

The power supply assembly 100 may include a lithium ion battery.

The separator is a membrane layer with a selective permeability. In the case that the power supply assembly is a lithium ion battery cell, the separator allows lithium ions to be transported between the positive electrode sheet and the negative electrode sheet, but blocks electrons from being transported between the positive electrode sheet and the negative electrode sheet.

The constituent material of the first foil may include a metal, for example, metal aluminum.

The positive electrode material may include an active material such as lithium cobalt oxide ($LiCoO_2$), a ternary compound composed of nickel, manganese and cobalt, lithium manganate ($LiMn_2O_4$), a conductive agent, and a binder, etc.

The positive electrode material may cover at least one side of the first foil. When the positive electrode material covers a first side and a second opposite side of the first foil, only a part of the positive electrode material on the first side or the second side of the first foil can be removed to form the first recess.

Alternatively, in some examples, a part of the positive electrode material may be removed at the position of each of the first side and the second side of the first foil corresponding to the first region, to form two first recesses, which are symmetrical about the first region.

It is emphasized that a size of the first recess is larger than a size of the positive tab. That is, a length of the first recess is larger than a length of the positive tab, a width of the first recess is larger than a width of the positive tab, and a depth of the first recess is larger than a thickness of the positive tab.

A size of the second recess is larger than a size of the negative tab. That is, a length of the second recess is larger than a length of the negative tab, a width of the second recess is larger than a width of the negative tab, and a depth of the second recess is larger than a thickness of the negative tab.

In some examples, an end portion of the positive electrode sheet may include multiple positive tabs arranged side by side, and an end portion of the negative electrode sheet may include multiple negative tabs arranged side by side.

Compared with the case in which only one positive tab is provided at the end portion of the positive electrode sheet, in the example of the present disclosure, by arranging multiple positive tabs side by side at the end portion of the positive electrode sheet, the power transmission path in the power supply assembly can be shortened, the impedance of the power supply assembly can be reduced, the amount of heat generated by the power supply assembly in the charging and discharging process can be reduced, and the charging speed of the power supply assembly can be increased.

Similarly, compared with the case in which only one negative tab is provided at the end portion of the negative electrode sheet, in the example of the present disclosure, by arranging multiple negative tabs side by side at the end portion of the negative electrode sheet, the power transmission path in the power supply assembly can be shortened, the impedance of the power supply assembly can be reduced, the amount of heat generated by the power supply assembly in the charging and discharging process can be reduced, and the charging speed of the power supply assembly can be increased.

It is noted that when the positive electrode sheet is provided with multiple positive tabs, the sum of the thickness of the multiple positive tabs is smaller than the depth of the first recess. When the negative electrode sheet is provided with multiple negative tabs, the sum of the thickness of the multiple negative tabs is smaller than the depth of the second recess.

In order to mark the position of each positive tab in the drawing of the specification, different filled marks are used to distinguish each positive tab from the first foil. However, the positive tabs and the first foil may be formed as an integrated structure, and the positive tabs and the first foil may be made of the same material. In addition, in order to mark the position of each positive tab in the drawing of the specification, different filled marks are used to distinguish each positive tab from the positive electrode material. However, the positive electrode material is also coated on the surface of each positive tab.

Specifically, the positive electrode material may be coated on the surface of the foil layer, and then the foil layer coated with the positive electrode material is cut to form a positive electrode sheet.

In the example of the present disclosure, by providing a first recess for receiving the bent positive electrode sheet, an increase in the thickness of the power supply assembly caused by the positive tab bent toward the positive electrode sheet can be canceled. Moreover, by receiving the bent positive tab in the first recess, the space of the power supply assembly occupied by the bent positive tab is reduced.

Similarly, in the example of the present disclosure, by providing a second recess for receiving the bent negative electrode sheet, an increase in the thickness of the power supply assembly caused by the bent negative tab can be canceled, and the space of the power supply assembly occupied by the bent negative tab is reduced.

In the power supply assembly provided in the examples of the present disclosure, by providing a first recess and a second recess, the thickness of the power supply assembly can be advantageously reduced, thereby providing a solution for application of a multi-tab structure in an ultra-thin battery cell. Furthermore, it is also possible to reduce the space of the power supply assembly occupied by the bent positive tab and the bent negative tab and thus advantageously reduce the volume of the power supply assembly, thereby improving the energy density of the battery, and improving the portability of the electronic device equipped with the power supply assembly.

Figure 3:
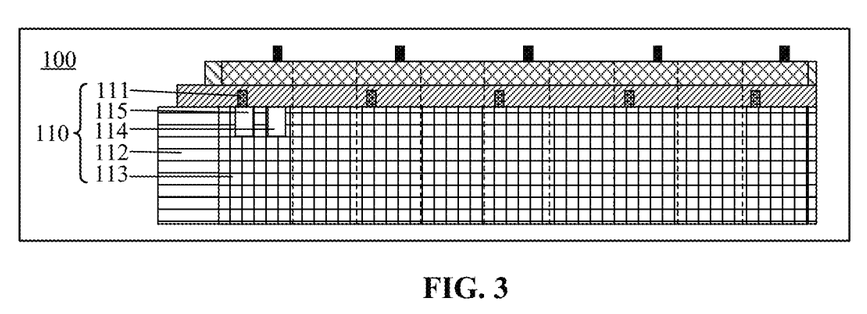
FIG. 3 is a schematic diagram of another power supply assembly according to an example of the present disclosure.

In some examples, as shown in FIG. 3, the negative electrode sheet 110 further includes a second foil 112, a negative electrode material 113, a third recess 114, and a fourth recess 115.

The negative electrode material covers a surface of the second foil.

The third recess is formed by removing a negative electrode material covering a third region of the second foil and configured for receiving the positive tab bent toward the positive electrode sheet. Herein, a size of the third recess is larger than a size of the positive tab.

The fourth recess is formed by removing a negative electrode material covering a fourth region of the second foil and configured for receiving the negative tab. Herein, a size of the fourth recess is larger than a size of the negative tab.

The constituent material of the second foil may include a metal, for example, metal copper.

The negative electrode material may include graphite, a conductive agent and a binder, etc.

The negative electrode material may cover at least one side of the second foil. When the negative electrode material covers a first side and a second opposite side of the second foil, only a part of the negative electrode material on the first side or the second side of the second foil can be removed to form the third recess.

Alternatively, in some examples, a part of the negative electrode material may be removed at the position of each of the first side and the second side of the second foil corresponding to the second region, to form two third recesses, which are symmetrical about the second region.

A size of the third recess is larger than a size of the positive tab. That is, a length of the third recess is larger than a length of the positive tab, a width of the third recess is larger than a width of the positive tab, and a depth of the third recess is larger than a thickness of the positive tab.

A size of the fourth recess is larger than a size of the negative tab. That is, a length of the fourth recess is larger than a length of the negative tab, a width of the fourth recess is larger than a width of the negative tab, and a depth of the fourth recess is larger than a thickness of the negative tab.

It is understood that, similar to forming a first recess and a second recess on the positive electrode sheet, in the example of the present disclosure, by providing a third recess on the negative electrode sheet for receiving the bent positive electrode sheet, an increase in the thickness of the power supply assembly caused by the positive tab bent toward the positive electrode sheet can be canceled. Moreover, by receiving the bent positive tab in the third recess, the space of the power supply assembly occupied by the bent positive tab is reduced.

Similarly, in the example of the present disclosure, by providing a fourth recess for receiving the bent negative electrode sheet, an increase in the thickness of the power supply assembly caused by the bent negative tab can be canceled, and the space of the power supply assembly occupied by the bent negative tab is reduced.

In the power supply assembly provided in the examples of the present disclosure, by providing a third recess and a fourth recess, the thickness of the power supply assembly can be advantageously reduced, thereby providing a solution for application of a multi-tab structure in an ultra-thin battery cell. Furthermore, it is also possible to reduce the space of the power supply assembly occupied by the bent positive tab and the bent negative tab and thus advantageously reduce the volume of the power supply assembly, thereby improving the energy density of the battery, and improving the portability of the electronic device equipped with the power supply assembly.

In some examples, the power supply assembly may include both a first recess and a third recess at the same time, and include both a second recess and a fourth recess at the same time. Moreover, the third recess is stacked with the first recess and the fourth recess is stacked with the second recess.

In the example of the present disclosure, a third recess stacked with a first recess and a fourth recess stacked with a second recess are provided on the negative electrode sheet, so that spaces provided by the first recess and the third recess can receive more positive electrode sheets, and spaces provided by the second recess and the fourth recess can receive more negative electrode sheets, which advantageously increases the volume of the space for receiving the positive electrode sheets and the negative electrode sheets, thereby further increasing the number of the positive electrode sheets and the negative electrode sheets provided in the power supply assembly to improve the charging and discharging performance of the power supply assembly, while ensuring a small variation range of the thickness and the energy density of the power supply assembly.

Figure 4:
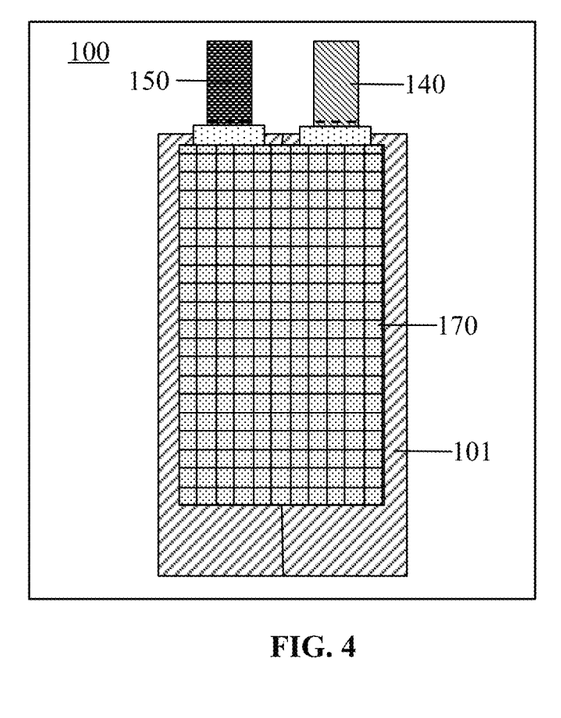
FIG. 4 is a schematic diagram of yet another power supply assembly according to an example of the present disclosure.

In some examples, as shown in FIG. 4, the power supply assembly further includes: a first welding tab 140, an end of the first welding tab being stacked and fixedly connected with the positive tab, and a first fixed connection structure formed by the first welding tab and the positive tab being located in the first recess; and a second welding tab 150, an end of the second welding tab being stacked and fixedly connected with the negative tab, and a second fixed connection structure formed by the second welding tab and the negative tab being located in the second recess.

Illustratively, an end of the first welding tab may be connected with an end of the positive tab by welding to form a first fixed connection structure. Further, an end of the second welding tab and an end of the negative tab may be welded together to form a second fixed connection structure.

The constituent material of the first welding tab may include metallic aluminum. The constituent material of the second welding tab may include metallic nickel.

When the end portion of the positive electrode sheet includes multiple positive tabs, the end portion of the negative electrode sheet includes multiple negative tabs, and the negative electrode sheet, the separator, and the positive electrode sheet are wound around the outer side of the winding pin to form the bare cell 101, the multiple positive tabs are overlapped and stacked with each other, and the multiple negative tabs are overlapped and stacked with each other. It can be understood that the positive tabs and the negative tabs are located inside the bare cell 101.

Figure 5:
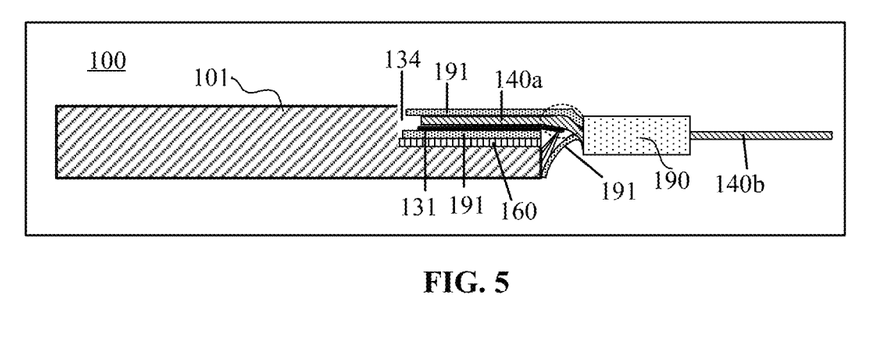
FIG. 5 is a cross-sectional schematic diagram of yet another power supply assembly according to an example of the present disclosure.

As shown in FIG. 4 and FIG. 5, an end 140a of the first welding tab fixedly connected to the positive tab is located inside the bare cell 101, and another end 140b of the first welding tab is exposed outside the bare cell 101 and serves as the positive pole of the power supply assembly. An end of the second welding tab fixedly connected to the negative tab is located inside the bare core 101, and another end of the second welding tab is exposed outside the bare core 101 and serves as the negative pole of the power supply assembly. Here, the another end of the first welding tab is an end opposite to the end at which the first welding tab is fixedly connected with the positive tab. The another end of the second welding tab is an end opposite to the end at which the second welding tab is fixedly connected with the negative tab.

The power supply assembly includes a positive pole and a negative pole for electrically connection with the external device. Here, the another end of the first welding tab exposed outside the bare cell 101 can be regarded as the positive pole, and the another end of the second welding tab exposed outside the bare cell 101 can be regarded as the negative pole.

Illustratively, the power supply assembly may also include a mesh glue 170. When the power supply assembly is packaged, the bare cell and the aluminum-plastic film can be adhered by the mesh glue 170 to increase the connection tightness between the bare cell 101 and the aluminum-plastic film, thereby providing protection to the bare cell 101.

It can be understood that when the positive electrode sheet is wound around the outer side of the winding pin, the positive electrode sheet can be divided into multiple fold regions stacked with each other, the two adjacent fold regions cover the two surfaces of the winding pin arranged opposite to each other. In some examples, when the positive electrode sheet is wound around the outer side of the winding pin, the first recess and the second recess are arranged away from the winding pin.

Illustratively, in the case in which the positive electrode sheet includes N bends (N is an integer greater than 2), when the positive electrode sheet is wound around the outer side of the winding pin from the first fold region of the positive electrode sheet, the first recess and the second recess may be provided on the Nth fold region of the positive electrode sheet.

When the positive electrode sheet is wound around the outer side of the winding pin and there are other fold regions between the fold region provided with the first recess and the positive tab, the other fold regions will be covered in the first recess, and the thickness of the other fold regions will reduce the volume of the receiving space formed on the surface of the first cell by the provision of the first recess. The receiving space is configured for receiving the bent positive tab.

It can be understood that the fewer the fold regions between the fold region provided with the first recess and the Nth fold region, the larger the volume of the receiving space formed by the provision of the first recess, and the more advantageous to reduce the increase in the thickness of the power supply assembly caused by the provision of multiple positive tabs.

In some examples, the thickness of the first fixed connection structure is smaller than the depth of the first recess. The thickness of the second fixed connection structure is smaller than the depth of the second recess. In this way, it is possible to further reduce the space of the power supply assembly occupied by the bent positive tab and the bent negative tab, thereby advantageously reducing the volume of the power supply assembly, reducing the thickness of the electronic device equipped with the power supply assembly, and improving the portability of the electronic device.

In some examples, as shown in FIG. 5, a portion of the first fixed connection structure extending beyond the first region is bent toward a side of the first foil. Further, a portion of the second fixed connection structure extending beyond the second region is bent toward a side of the first foil.

Illustratively, the first fixed connection structure includes a first bending portion. Herein, the first bending portion extends beyond the first region and is bent toward a side of the first foil.

The second fixed connection structure includes a second bending portion. Herein, the second bending portion extends beyond the second region and is bent toward a side of the first foil.

The first bending portion is shown in the dashed box in FIG. 5. In the example of the present disclosure, by bending the portion of the first fixed connection structure extending beyond the first region toward a side of the first foil, the region in which the first fixed connection structure is bent can play a buffering role when the power supply assembly is stretched or collided, thereby decreasing the risk of breakage of the positive tab and/or the first welding tab due to stretching by external force, and decreasing the risk of damage of the power supply assembly caused by the insertion of the positive tab and/or the first welding tab into the bare cell due to the collision.

Meanwhile, in the example of the present disclosure, by bending the portion of the second fixed connection structure extending beyond the second region toward a side of the first foil, the region in which the second fixed connection structure is bent can play a buffering role when the power supply assembly is stretched or collided, thereby decreasing the risk of breakage of the negative tab and/or the second welding tab due to stretching by external force, and decreasing the risk of damage of the power supply assembly caused by the insertion of the negative tab and/or the second welding tab into the bare cell due to the collision.

In some examples, as shown in FIG. 5, the power supply assembly further includes tab glue 190. For the packaged power supply assembly, the tab glue 190 is located outside the aluminum-plastic film.

In some examples, as shown in FIG. 5, the power supply assembly may further include: a first insulating layer 191 covering a surface of the first fixed connection structure; and a second insulating layer covering a surface of the second fixed connection structure.

It needs to be noted that the first insulating layer is configured for electrically isolating the first fixed connection structure from other conductive structures in the power supply assembly, and the second insulating layer is configured for electrically isolating the second fixed connection structure from other conductive structures in the power supply assembly, so as to avoid short circuit of the power supply assembly. Other conductive structures in the power supply assembly may include a positive electrode sheet or a negative electrode sheet, etc.

The constituent material of each of the first insulating layer 191 and the second insulating layer may include an insulating adhesive tape having adhesion. In some examples, as shown in FIG. 5, the power supply assembly further includes: a first bonding layer 160 having elasticity arranged between the first fixed connection structure and the first region, to bond the first fixed connection structure to the first foil; and a second bonding layer having elasticity arranged between the second fixed connection structure and the second region, to bond the second fixed connection structure to the first foil.

The first bonding layer and the second bonding layer are electrically insulated. The constituent materials of the first bonding layer and the second bonding layer may include glue, for example, mesh glue.

In the example of the present disclosure, the first bonding layer is provided, so that the tightness degree of connection between the first fixed connection structure and the first region can be improved, and the decrease in the reliability of the power supply assembly due to the deviation of the first fixed connection structure can be reduced, while preventing the positive tab from short-circuiting. The second bonding layer is provided, so that the tightness degree of connection between the second fixed connection structure and the second region can be improved, and the decrease in the reliability of the power supply assembly due to the deviation of the first fixed connection structure can be reduced, while preventing the negative tab from short-circuiting.

In addition, since the first bonding layer and the second bonding layer have elasticity, the first bonding layer can buffer the mutual pulling between the positive tab and the first region, as well as between the first welding tab and the first region, and the second bonding layer can also buffer the mutual pulling between the negative tab and the second region, as well as between the second welding tab and the second region, during falling of the power supply assembly, thereby reducing the damage of the power supply assembly due to the relatively large pulling force.

Figure 6A:
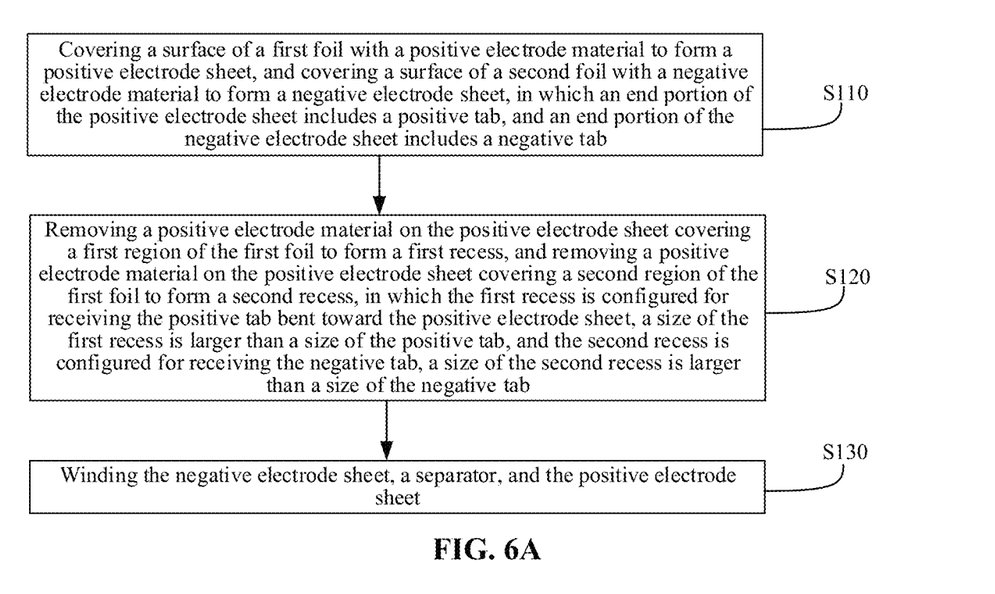
FIG. 6A is a flowchart of a method for manufacturing a power supply assembly according to an example of the present disclosure.

FIG. 6A is a flowchart of a method for manufacturing a power supply assembly according to an example of the present disclosure. As shown in FIG. 6A, the method includes the following steps.

In S110, a surface of a first foil is covered with a positive electrode material to form a positive electrode sheet, and a surface of a second foil is covered with a negative electrode material to form a negative electrode sheet. Herein, an end portion of the positive electrode sheet includes a positive tab, and an end portion of the negative electrode sheet includes a negative tab.

In S120, a positive electrode material on the positive electrode sheet covering a first region of the first foil is removed to form a first recess, and a positive electrode material on the positive electrode sheet covering a second region of the first foil is removed to form a second recess. Herein, the first recess is configured for receiving the positive tab bent toward the positive electrode sheet, and a size of the first recess is larger than a size of the positive tab. Moreover, the second recess is configured for receiving the negative tab, and a size of the second recess is larger than a size of the negative tab.

In S130, the negative electrode sheet, a separator, and the positive electrode sheet are wound.

In the example of the present disclosure, a first recess is formed by removing a positive electrode material covering the first region of the first foil, and configured for receiving the positive tab bent toward the positive electrode sheet, so that an increase in the thickness of the power supply assembly caused by the positive tab bent toward the positive electrode sheet can be canceled. Moreover, a second recess is formed by removing a positive electrode material covering the second region of the first foil, and configured for receiving the negative tab, so that an increase in the thickness of the power supply assembly caused by the bent negative tab can be canceled. That is, the first recess and the second recess can reduce the influence of the bending of the positive tab and the negative tab on the thickness of the battery cell, and reduce the thickness of the power supply assembly, thereby providing a solution for the application of the multi-tab structure in the ultra-thin battery cell, and enlarging the application range of the multi-tab structure.

Furthermore, the bent positive tab is received by the first recess, and the bent negative tab is received by the second recess, so that the space of the power supply assembly occupied by the bent positive tab and the bent negative tab is reduced, and the volume of the power supply assembly is advantageously reduced, thereby improving the energy density of the battery.

Figure 6B:
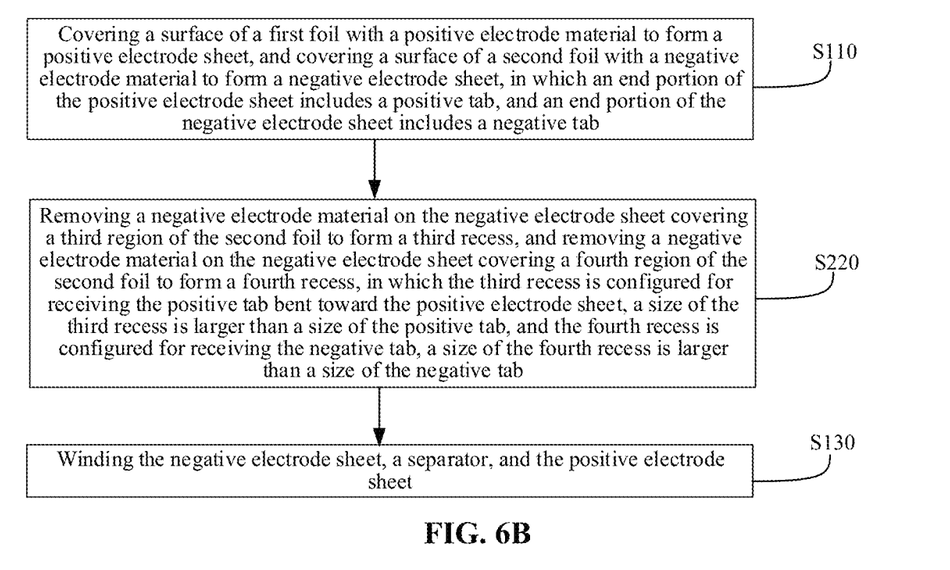
FIG. 6B is a flowchart of another method for manufacturing a power supply assembly according to an example of the present disclosure.

FIG. 6B is a flowchart of another method for manufacturing a power supply assembly according to an example of the present disclosure. As shown in FIG. 6B, the method includes the following steps.

In S110, a surface of a first foil is covered with a positive electrode material to form a positive electrode sheet, and a surface of a second foil is covered with a negative electrode material to form a negative electrode sheet. Herein, an end portion of the positive electrode sheet includes a positive tab, and an end portion of the negative electrode sheet includes a negative tab.

In S120, a negative electrode material on the negative electrode sheet covering a third region of the second foil is removed to form a third recess, and a negative electrode material on the negative electrode sheet covering a fourth region of the second foil is removed to form a fourth recess. Herein, the third recess is configured for receiving the positive tab bent toward the positive electrode sheet, and a size of the third recess is larger than a size of the positive tab. Moreover, the fourth recess is configured for receiving the negative tab, and a size of the fourth recess is larger than a size of the negative tab.

In S130, the negative electrode sheet, a separator, and the positive electrode sheet are wound.

In the example of the present disclosure, a third recess is formed by removing a negative electrode material covering the third region of the second foil, and configured for receiving the positive tab bent toward the positive electrode sheet, so that an increase in the thickness of the power supply assembly caused by the positive tab bent toward the positive electrode sheet can be canceled. Moreover, a fourth recess is formed by removing a negative electrode material covering the fourth region of the second foil, and configured for receiving the negative tab, so that an increase in the thickness of the power supply assembly caused by the bent negative tab can be canceled. That is, the third recess and the fourth recess can reduce the influence of the bending of the positive tab and the negative tab on the thickness of the battery cell, and reduce the thickness of the power supply assembly, thereby providing a solution for the application of the multi-tab structure in the ultra-thin battery cell, and enlarging the application range of the multi-tab structure.

Furthermore, the bent positive tab is received by the third recess, and the bent negative tab is received by the fourth recess, so that the space of the power supply assembly occupied by the bent positive tab and the bent negative tab is reduced, and the volume of the power supply assembly is advantageously reduced, thereby improving the energy density of the battery.

It needs be noted that in some examples, before S130, the method may include both S120 and S220 described above. Further, after S130, the third recess and the first recess are stacked with each other, and the fourth recess and the second recess are stacked with each other.

In the example of the present disclosure, a third recess stacked with a first recess and a fourth recess stacked with a second recess stack are provided on the negative electrode sheet, so that the spaces provided by the first recess and the third recess can receive more positive electrode sheets, and the spaces provided by the second recess and the fourth recess can receive more negative electrode sheets, which advantageously increases the volume of the space for receiving the positive electrode sheets and the negative electrode sheets, thereby further increasing the number of the positive electrode sheets and the negative electrode sheets provided in the power supply assembly to improve the charging and discharging performance of the power supply assembly, while ensuring a small variation range of the thickness and the energy density of the power supply assembly.

In some examples, the method further includes the following operations.

Figure 7A:
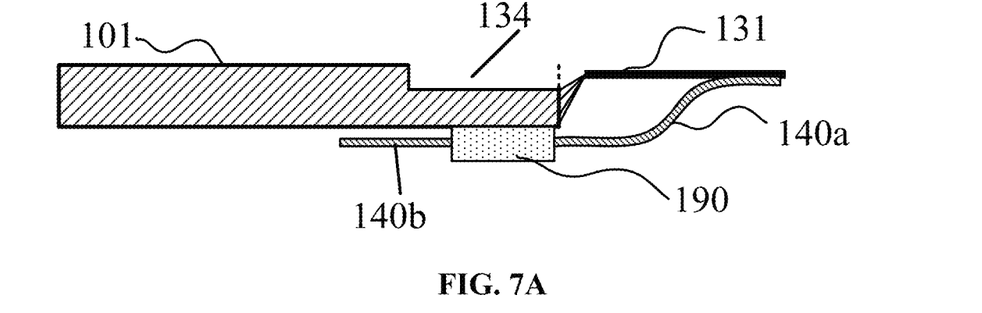
FIG. 7A is a schematic diagram of a method for manufacturing a power supply assembly according to one or more examples of the present disclosure.

As shown in FIG. 7A, an end of a first welding tab is fixedly connected with the positive tab to form a first fixed connection structure.

An end of a second welding tab is fixedly connected with the negative tab to form a second fixed connection structure.

Figure 7B:
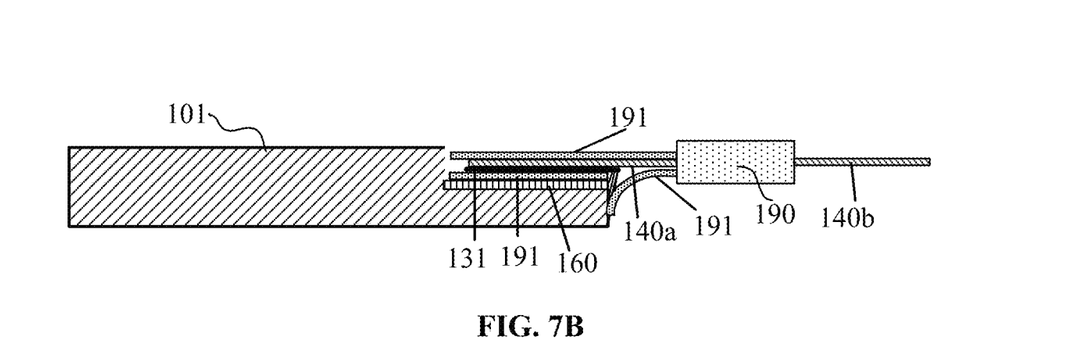
FIG. 7B is a second schematic diagram of the method for manufacturing a power supply assembly according to one or more examples of the present disclosure.

As shown in FIG. 7B, the first fixed connection structure is bent toward the first recess, to fix the positive tab in the first recess.

The second fixed connection structure is bent toward the second recess, to fix the negative tab in the second recess.

Illustratively, an end of the first welding tab may be fixedly connected with the positive tab by welding to form a first fixed connection structure. An end of the second welding tab is fixed to the negative tab by welding to form a second fixed connection structure.

In the example of the present disclosure, the first fixed connection structure is bent toward the first recess, and the second fixed connection structure is bent toward the second recess. The bent first fixed connection structure and the bent second fixed connection structure each include an arc-shaped region, which can play a buffering role, so that the activity of each of the first fixed connection structure and the second fixed connection structure is advantageously increased, and thus the risk of breakage of the first fixed connection structure and the second fixed connection structure in a falling process is decreased.

It is noted that the first fixed connection structure includes a partial region of the positive tab and a partial region of the first welding tab. The second fixed connection structure includes a partial region of the negative tab and a partial region of the second welding tab.

Figure 7C:
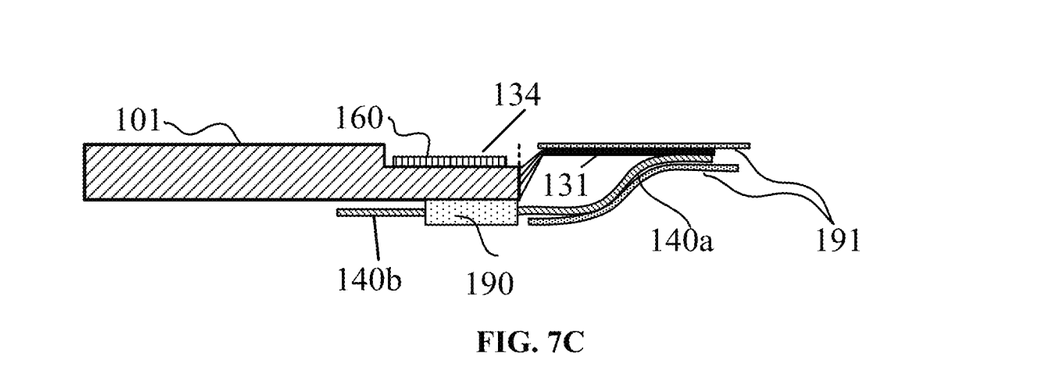
FIG. 7C is a third schematic diagram of the method for manufacturing a power supply assembly according to one or more examples of the present disclosure.

In some examples, the method further includes the following steps. First insulating layer(s) is/are bonded to the surface of the first fixed connection structure after forming the first fixed connection structure (as shown in FIG. 7c). Second insulating layer(s) is/are bonded to the surface of the second fixed connection structure after forming the second fixed connection structure.

In the example of the present disclosure, the first insulating layer covers the surface of the first fixed connection structure, and the second insulating layer covers the second fixed connection structure, so that the first insulating layer can electrically isolate the first fixed connection structure from other conductive structures in the power supply assembly, and the second insulating layer can electrically isolate the second fixed connection structure from other conductive structures in the power supply assembly, so as to avoid short circuit of the power supply assembly, thereby improving the reliability of the power supply assembly.

As shown in FIG. 7C, the method further includes the following steps. A first bonding layer having elasticity is formed in the first recess. A second bonding layer having elasticity is formed in the second recess. In some examples, the step of fixing the positive tab in the first recess includes fixedly connecting the first fixed connection structure with the first region through the first bonding layer having elasticity; and the step of fixing the negative tab in the second recess includes fixedly connecting the second fixed connection structure with the second region through a second bonding layer having elasticity.

The first bonding layer and the second bonding layer are electrically insulated. The constituent materials of the first bonding layer and the second bonding layer may include glue, for example, mesh glue.

In the example of the present disclosure, the first bonding layer is provided, so that the tightness degree of connection between the first fixed connection structure and the first region can be improved, and the decrease in the reliability of the power supply assembly due to the deviation of the first fixed connection structure can be reduced, while preventing the positive tab from short-circuiting. The second bonding layer is provided, so that the tightness degree of connection between the second fixed connection structure and the second region can be improved, and the decrease in the reliability of the power supply assembly due to the deviation of the first fixed connection structure can be reduced, while preventing the negative tab from short-circuiting.

In addition, since the first bonding layer and the second bonding layer have elasticity, the first bonding layer can buffer the mutual pulling between the positive tab and the first region, as well as between the first welding tab and the first region, and the second bonding layer can also buffer the mutual pulling between the negative tab and the second region, as well as between the second welding tab and the second region during falling of the power supply assembly, thereby reducing the damage of the power supply assembly due to the large pulling force.

In some examples, the step of bending the first fixed connection structure toward the first recess includes bending a portion of the first fixed connection structure extending beyond the first region toward a side of the first foil.

The step of bending the second fixed connection structure toward the second recess includes bending a portion of the second fixed connection structure extending beyond the second region toward a side of the first foil.

Specifically, the first bending portion shown in FIG. 5 may be formed by bending a portion of the first fixed connection structure extending beyond the first region toward a side of the first foil.

A second bending portion may be formed by bending a portion of the second fixed connection structure extending beyond the second region toward a side of the first foil.

Illustratively, the first fixed connection structure may be slightly bent to form a first bending portion. The included angle of the first bending portion may be an obtuse angle. Similarly, the included angle of the second bending portion may be an obtuse angle.

In the example of the present disclosure, by bending the portion of the first fixed connection structure extending beyond the first region toward a side of the first foil, the region in which the first fixed connection structure is bent can play a buffering role when the power supply assembly is stretched or collided, thereby decreasing the risk of breakage of the positive tab and/or the first welding tab due to stretching by external force, and decreasing the risk of damage of the power supply assembly caused by the insertion of the positive tab and/or the first welding tab into the bare cell due to the collision.

Moreover, by bending the portion of the second fixed connection structure extending beyond the second region toward a side of the first foil, the region in which the second fixed connection structure is bent can play a buffering role when the power supply assembly is stretched or collided, thereby decreasing the risk of breakage of the negative tab and/or the second welding tab due to stretching by external force, and decreasing the risk of damage of the power supply assembly caused by the insertion of the negative tab and/or the second welding tab into the bare cell due to the collision.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary technical means in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A power supply assembly, comprising:
a negative electrode sheet comprising a first end, a separator, and a positive electrode sheet comprising a second end, wherein the first end of the negative electrode sheet comprises negative tabs, and the second end of the positive electrode sheet comprises positive tabs;
wherein the positive electrode sheet further comprises a first foil and a positive electrode material, the positive electrode material covering a surface of the first foil;
wherein the negative electrode sheet further comprises a second foil and a negative electrode material, the negative electrode material covering a surface of the second foil; and
wherein the power supply assembly further comprises at least one of following configurations:
(a) the positive electrode sheet further comprising a first recess and a second recess; wherein the first recess is disposed at a first region of the positive electrode sheet by removing a positive electrode material covering a first region of the first foil, and is configured to receive the positive tabs bent toward the positive electrode sheet, wherein a size of the first recess is larger than size of the positive tabs; and wherein the second recess is disposed at a second region of the positive electrode sheet by removing a positive electrode material covering a second region of the first foil, and is configured to receive the negative tabs that are bent, wherein a size of the second recess is larger than size of the negative tabs; or
(b) the negative electrode sheet further comprising a third recess and a fourth recess; wherein the third recess is disposed at a third region of the negative electrode sheet by removing a negative electrode material covering a third region of the second foil, and is configured to receive the positive tabs bent toward the positive electrode sheet, wherein a size of the third recess is larger than size of the positive tabs; and wherein the fourth recess is disposed at a fourth region of the negative electrode sheet by removing a negative electrode material covering a fourth region of the second foil, and is configured to receive the negative tabs that are bent, wherein a size of the fourth recess is larger than size of the negative tabs,
wherein the power supply assembly is formed by winding the negative electrode sheet, the separator, and the positive electrode sheet, wherein the power supply assembly further comprises:
a first welding tab, wherein an end of the first welding tab is stacked and fixedly connected with the positive tabs, and wherein a first fixed connection formed by the first welding tab and the positive tabs is bent toward a bottom of the first recess to fix the positive tabs in the first recess, and the first fixed connection is disposed in the first recess; and
a second welding tab, wherein an end of the second welding tab is stacked and fixedly connected with the negative tabs, and wherein a second fixed connection formed by the second welding tab and the negative tabs is bent toward a bottom of the second recess to fix the negative tabs in the second recess, and the second fixed connection is disposed in the second recess, and
wherein the positive tabs before bending towards the bottom of the first recess are located at the second end of the positive electrode sheet and outside of the first recess; and the negative tabs before bending towards the bottom of the second recess are located at the first end of the negative electrode sheet and outside of the second recess.

2. The power supply assembly of claim 1, wherein a portion of the first fixed connection extending beyond the first region is bent toward a side of the first foil; and
wherein a portion of the second fixed connection extending beyond the second region is bent toward a side of the first foil.

3. The power supply assembly of claim 1, further comprising:
a first bonding layer having elasticity disposed between the first fixed connection and the first region to bond the first fixed connection to the first foil; and
a second bonding layer having elasticity disposed between the second fixed connection and the second region to bond the second fixed connection to the first foil.

4. The power supply assembly of claim 1, further comprising:
a first insulating layer covering a surface of the first fixed connection; and
a second insulating layer covering a surface of the second fixed connection.

5. The power supply assembly of claim 1, wherein when the positive electrode sheet is wound, the positive electrode sheet is divided into a plurality of fold regions stacked with each other.

6. The power supply assembly of claim 5, when the positive electrode sheet is wound and one of the plurality of fold regions is presented between another one of the plurality of fold regions provided with the first recess and one of the positive tabs, the one of the plurality of fold regions is covered in the first recess.

7. A method for manufacturing a power supply assembly, comprising:
covering a surface of a first foil with a positive electrode material to form a positive electrode sheet, and covering a surface of a second foil with a negative electrode material to form a negative electrode sheet; wherein an end of the positive electrode sheet comprises positive tabs, and an end of the negative electrode sheet comprises negative tabs;
winding the negative electrode sheet, a separator, and the positive electrode sheet;
the method further comprises, before the step of winding the negative electrode sheet, the separator, and the positive electrode sheet, at least one of following steps:

(a) removing a positive electrode material on the positive electrode sheet covering a first region of the first foil to form a first recess, wherein the first recess is configured to receive the positive tabs bent toward the positive electrode sheet, and a size of the first recess is larger than size of the positive tabs; and removing a positive electrode material on the positive electrode sheet covering a second region of the first foil to form a second recess, wherein the second recess is configured to receive the negative tabs that are bent, and a size of the second recess is larger than size of the negative tabs; or (b) removing a negative electrode material on the negative electrode sheet covering a third region of the second foil to form a third recess, wherein the third recess is configured to receive the positive tabs bent toward the positive electrode sheet, and a size of the third recess is larger than a size of the positive tabs; and removing a negative electrode material on the negative electrode sheet covering a fourth region of the second foil to form a fourth recess, wherein the fourth recess is configured to receive the negative tabs that are bent, and a size of the fourth recess is larger than size of the negative tabs, wherein the method further comprises:

fixedly connecting an end of a first welding tab with the positive tabs to form a first fixed connection;

fixedly connecting an end of a second welding tab with the negative tabs to form a second fixed connection;

bending the first fixed connection toward a bottom of the first recess to fix the positive tabs in the first recess; and bending the second fixed connection toward a bottom of the second recess to fix the negative tabs in the second recess, and wherein the positive tabs before bending towards the bottom of the first recess are located at the end of the positive electrode sheet and outside of the first recess; and the negative tabs before bending towards the bottom of the second recess are located at the end of the negative electrode sheet and outside of the second recess.

8. The method of claim 7, wherein bending the first fixed connection toward the first recess comprises bending a portion of the first fixed connection extending beyond the first region toward a side of the first foil; and wherein bending the second fixed connection toward the second recess comprises bending a portion of the second fixed connection extending beyond the second region toward a side of the first foil.

9. The method of claim 7, wherein fixing the positive tabs in the first recess comprises fixedly connecting the first fixed connection with the first region through a first bonding layer having elasticity; and wherein fixing the negative tabs in the second recess comprises fixedly connecting the second fixed connection with the second region through a second bonding layer having elasticity.

10. The method of claim 7, further comprising:

forming a first insulating layer covering a surface of the first fixed connection after forming the first fixed connection; and forming a second insulating layer covering a surface of the second fixed connection after forming the second fixed connection;

wherein bending the first fixed connection toward the first recess comprises bending the first fixed connection toward the first recess, wherein the surface of the first fixed connection is covered by the first insulating layer; and wherein bending the second fixed connection toward the second recess comprises bending the second fixed connection toward the second recess, wherein the surface of the second fixed connection covered by the second insulating layer.

\* \* \* \* \*